(12) United States Patent
Zhang et al.

(10) Patent No.: US 12,110,097 B2
(45) Date of Patent: Oct. 8, 2024

(54) FOLDING PROPELLER, POWER COMPONENT AND UNMANNED AERIAL VEHICLE

(71) Applicant: AUTEL ROBOTICS CO., LTD., Guangdong (CN)

(72) Inventors: Hailang Zhang, Guangdong (CN); Wei Sun, Guangdong (CN); Dongdong Luo, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 22 days.

(21) Appl. No.: 16/906,561

(22) Filed: Jun. 19, 2020

(65) Prior Publication Data

US 2020/0317325 A1 Oct. 8, 2020

Related U.S. Application Data (63) Continuation of application No. PCT/CN2018/104149, filed on Sep. 5, 2018.

(30) Foreign Application Priority Data

Dec. 19, 2017 (CN) .......................... 201711377345.9

(51) Int. Cl.
*B64C 11/04* (2006.01)
*B64C 11/22* (2006.01)
(Continued)

(52) U.S. Cl.
CPC .............. *B64C 11/04* (2013.01); *B64C 11/22* (2013.01); *B64C 11/28* (2013.01); *B64C 27/50* (2013.01); *B64U 30/20* (2023.01)

(58) Field of Classification Search
CPC ......... B64C 11/02; B64C 11/28; B64C 11/08; B64C 11/10; B64C 11/12; B64C 11/04;
(Continued)

(56) References Cited

U.S. PATENT DOCUMENTS

| 4,252,504 A | 2/1981 | Covington et al. |
| 4,936,526 A | 6/1990 | Gries |

(Continued)

FOREIGN PATENT DOCUMENTS

| CN | 204548482 U | 8/2015 |
| CN | 105035303 A | 11/2015 |

(Continued)

OTHER PUBLICATIONS

English translation of CN105564635A (Year: 2016).*

(Continued)

*Primary Examiner* — Woody A Lee, Jr.
*Assistant Examiner* — Wesley Le Fisher
(74) *Attorney, Agent, or Firm* — Frank Gao, Esq.

(57) ABSTRACT

Embodiments of the present application relate to the technical field of propellers, and particularly to a folding propeller, a power component and an unmanned aerial vehicle. The folding propeller includes a hub, at least two blades and at least two connecting pieces, the hub being configured to mount the folding propeller to a driving device. The hub includes a first surface and a second surface disposed oppositely, the first surface facing the driving device, and the second surface facing away from the driving device. Each of the blades is mounted on the second surface by the corresponding connecting piece, and each of the blades is capable of rotating relative to the hub. In the above manner, according to the embodiments of the present application, during mold adjustment in injection molding, a rotary damping between the blade and the hub can be adjusted by only adjusting the friction force of one contact surface, which is convenient for mold adjustment, is beneficial to mass production and reduces the production cost.

14 Claims, 6 Drawing Sheets

(51) Int. Cl.
*B64C 11/28* (2006.01)
*B64C 27/50* (2006.01)
*B64U 30/20* (2023.01)

(58) Field of Classification Search
CPC ........ B64C 2201/108; B64C 2201/027; B64C 27/50; B64C 27/39; B64C 27/48; B64C 27/57; A63H 27/12
See application file for complete search history.

(56) References Cited

U.S. PATENT DOCUMENTS

| | | | | |
|---|---|---|---|---|
| 5,743,489 | A * | 4/1998 | Stemme | B64C 11/48 |
| | | | | 244/65 |
| 9,612,599 | B2 * | 4/2017 | Bradlow | G05D 1/0669 |
| 10,661,891 | B2 * | 5/2020 | Baek | B64C 39/024 |
| 11,535,369 | B2 * | 12/2022 | Goldstein | B64C 39/024 |
| 2016/0001879 | A1 | 1/2016 | Johannesson et al. | |
| 2017/0284371 | A1 | 10/2017 | Gamble | |
| 2017/0320565 | A1 | 11/2017 | Gamble et al. | |
| 2018/0257769 | A1 * | 9/2018 | Goldstein | B64C 27/50 |

FOREIGN PATENT DOCUMENTS

| | | | | | |
|---|---|---|---|---|---|
| CN | 205524938 | U | | 1/2016 | |
| CN | 105460206 | A | | 4/2016 | |
| CN | 105564635 | A | * | 5/2016 | ............. B64C 11/04 |
| CN | 105947182 | A | | 9/2016 | |
| CN | 205661661 | U | | 10/2016 | |
| CN | 205661662 | U | | 10/2016 | |
| CN | 206107533 | U | * | 4/2017 | |
| CN | 107108028 | A | * | 8/2017 | ............. B64C 11/04 |
| CN | 206502024 | U | | 9/2017 | |
| CN | 107235145 | A | * | 10/2017 | |
| CN | 107891968 | A | | 4/2018 | |
| CN | 207758997 | U | | 8/2018 | |
| GB | 2030879 | A | * | 4/1980 | ............. A63H 27/12 |
| JP | 3211001 | U | | 6/2017 | |
| JP | 2017128258 | A | | 7/2017 | |
| KR | 2017014961 | A | * | 2/2017 | ............. B64C 11/28 |
| WO | 2014141154 | A1 | | 9/2014 | |
| WO | WO-2019085150 | A1 | * | 5/2019 | ............. B64C 11/04 |

OTHER PUBLICATIONS

English translation of CN107235145A (Year: 2017).*
English translation of CN107108028A (Year: 2017).*
English translation of CN206107533U (Year: 2017).*
International Search Report Mailed Nov. 22, 2018; Application No. PCT/CN2018/104149.
The extended European Search Report dated Aug. 30, 2021; Appln. No. 18891318.0.
The First Chinese Office Action dated Sep. 22, 2023; Appln. No. 201711377345.9 with English Translation.

* cited by examiner

FOLDING PROPELLER, POWER COMPONENT AND UNMANNED AERIAL VEHICLE

This application is a continuation application of International Application No. PCT/CN2018/104149, filed on Sep. 5, 2018, which claims priority of Chinese Patent Application No. 201711377345.9, filed on Dec. 19, 2017, which is incorporated herein by reference in its entirely.

BACKGROUND

Technical Field

Embodiments of the present application relate to the technical field of propellers, and particularly to a folding propeller, a power component using the folding propeller and an unmanned aerial vehicle using the power component.

Related Art

An unmanned aerial vehicle is an unmanned aircraft that controls flight attitude through radio remote control equipment and built-in programs. Due to its advantages of high flexibility, fast response, unmanned driving, low operating requirements and the like, the unmanned aerial vehicle is now widely used in aerial photography, plant protection, power inspection, disaster relief and many other fields. With the development of wireless Internet, wireless local area networks and image processing techniques, the unmanned aerial vehicle has been favored by more and more users.

A propeller is an important part of a power component of the unmanned aerial vehicle. It is usually composed of a hub and two or more blades distributed in an axisymmetric form. The blades are mounted on the hub, and the hub is fixedly mounted on a driving device. When the driving device rotates, the blades are driven to rotate together by the hub, thereby providing driving power for the unmanned aerial vehicle.

In the process of implementing the present application, the inventors found that at present, in order to facilitate users to carry the unmanned aerial vehicle and reduce the space occupied by the unmanned aerial vehicle, related techniques have proposed some foldable propellers. However, in the existing foldable propellers, the blades are mounted on the hub generally by a clamping structure. In order to have the same rotary damping between the hub and the blades, the friction between two contact surfaces of the blade and the clamping structure needs to be adjusted, which is not convenient for mold adjustment.

SUMMARY

Embodiments of the present application provide a folding propeller, a power component and an unmanned aerial vehicle, which can solve the problems that the existing folding propeller is not convenient for mold adjustment and is high in production cost.

In order to solve the above technical problems, a technical solution adopted by the present application is to provide a folding propeller, including a hub, at least two blades and at least two connecting pieces, the hub being configured to mount the folding propeller to a driving device.

The hub includes a first surface and a second surface disposed oppositely, the first surface facing the driving device, and the second surface facing away from the driving device.

Each of the blades is mounted on the second surface by the corresponding connecting piece, and each of the blades is capable of rotating relative to the hub.

In some embodiments, the hub includes a main body portion and at least two overlapping portions connected to the main body portion, and the main body portion and the overlapping portion respectively include two surfaces disposed oppositely, one surface of the main body portion being connected to one surface of the overlapping portion to form the first surface, and the other surface of the main body portion being connected to the other surface of the overlapping portion to form the second surface.

The overlapping portion is in one-to-one correspondence with the blade and the connecting piece, the overlapping portion being pivoted to the blade by the connecting piece.

In some embodiments, each of the blades includes a pivoting portion, and each of the pivoting portions is overlapped on the corresponding overlapping portion and pivoted to the overlapping portion by the connecting piece.

In some embodiments, a lower surface of the pivoting portion is in contact with the second surface.

In some embodiments, the hub further includes a boss disposed on the second surface.

A protruding edge extends from each of the pivoting portions, the protruding edge being overlapped on the boss.

In some embodiments, a lower surface of the protruding edge is in contact with an upper surface of the boss.

In some embodiments, the hub further includes a boss disposed on the second surface.

A protruding edge extends from each of the pivoting portions, the protruding edge being located above the boss. When the folding propeller is driven to rotate by the driving device, the protruding edge is in contact with an upper surface of the boss.

In some embodiments, the boss has an annular cross section.

In some embodiments, a center line of the boss coincides with a center line of a rotating shaft of the driving device.

In some embodiments, the number of the bosses is two.

In some embodiments, the boss has a semicircular or rectangular cross section. In some embodiments, the protruding edge is in a circular arc shape.

In some embodiments, a through hole is formed in the at least two overlapping portions respectively.

Mounting holes are formed in the at least two pivoting portions corresponding to the through holes.

The connecting piece passes through the mounting hole and the through hole to mount the blade to the overlapping portion.

In some embodiments, each of the connecting pieces includes a first abutting portion, a second abutting portion and a connecting portion connecting the first abutting portion and the second abutting portion.

A surface of the first abutting portion facing the second abutting portion abuts against the first surface.

A surface of the second abutting portion facing the first abutting portion abuts against a side surface of the blade facing away from the overlapping portion.

The connecting portion passes through the mounting hole and the through hole.

In some embodiments, the blade is fixedly connected to the connecting piece by injection molding, and the hub is pivoted to the connecting piece.

In some embodiments, an annular groove is formed in the connecting portion, and an annular protrusion is disposed in the mounting hole, the annular protrusion being locked in the annular groove.

In some embodiments, the second abutting portion includes a tooth portion, and a limit slot is formed in the blade corresponding to the tooth portion, the tooth portion being locked in the limit slot.

In some embodiments, the hub is fixedly connected to the connecting piece by injection molding, and the blade is pivoted to the connecting piece.

In some embodiments, an annular groove is formed in the connecting portion, and an annular protrusion is disposed in the through hole, the annular protrusion being locked in the annular groove.

In some embodiments, the first abutting portion includes a tooth portion, and a limit slot is formed in the hub corresponding to the tooth portion, the tooth portion being locked in the limit slot.

In order to solve the above technical problems, another technical solution adopted by the present application is to provide a power component, including: a driving device and the folding propeller as described above mounted on the driving device.

In order to solve the above technical problems, still another technical solution adopted by the present application is to provide an unmanned aerial vehicle, including the power component as described above.

The embodiments of the present application have the following beneficial effects: compared with the prior art, the embodiments of the present application provides the hub of the folding propeller including the first surface and the second surface disposed oppositely, the first surface faces the driving device connected to the folding propeller, the second surface faces away from the driving device, and each of the blades is mounted on the second surface by the corresponding connecting piece, so that only one contact surface is included between the blade and the hub, and during the mold adjustment in injection molding, the rotary damping between the blade and the hub can be adjusted by only adjusting the friction force of one contact surface, which is convenient for mold adjustment, is beneficial to mass production and reduces the production cost.

Further, in the embodiments of the present application, the hub of the folding propeller further includes the boss disposed on the second surface, the protruding edge extends from one end of each of the blades connected to the hub, and the protruding edge is overlapped on the boss. Thus, when the folding propeller rotates at a high speed, the force borne by the end of the blade connected to the hub can be distributed to the hub through the protruding edge and the boss, so that the reliability of the folding propeller during operation can be ensured without disposing a clamping structure in the hub.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding this application, this application is described in further detail below with reference to the accompanying drawings and specific embodiments. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. As used in the specification, orientation or position relationships indicated by the terms such as "upper", "lower", "inside", "outside", "top", and "bottom" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application Unless otherwise defined, all technical and scientific terms used herein have the same meaning as commonly understood by one of ordinary skill in the art to which this application belongs. The terms used in the specification of this application are merely used for describing specific embodiments, and are not intended to limit this application. In addition, the technical features provided in different embodiments of this application to be described below may be combined with each other as long as no conflict occurs. As used herein, the term "and/or" includes any and all combinations of one or more related items listed.

A folding propeller provided by embodiments of the present application is a foldable propeller in which only one contact surface is included between a blade and a hub. The folding propeller may be integrally formed by injection molding. During mold adjustment in the injection molding, the rotary damping between the blade and the hub can be adjusted by only adjusting the friction force of one contact surface, which is convenient for mold adjustment, is beneficial to mass production and reduces the production cost.

Further, in the embodiments of the present application, the hub of the folding propeller further includes a boss disposed on a second surface, a protruding edge extends from one end of each of the blades connected to the hub, and the protruding edge is overlapped on the boss. Thus, when the folding propeller rotates at a high speed, the force borne by the end of the blade connected to the hub can be distributed to the hub through the protruding edge and the boss, so that the reliability of the folding propeller during operation can be ensured without disposing a clamping structure in the hub.

The folding propeller provided by the embodiments of the present application can be applied to any type of unmanned aerial vehicle, for example, a rotor unmanned aircraft and a tiltrotor unmanned aircraft. The rotor unmanned aircraft includes, but is not limited to, single-rotor, dual-rotor, quadrotor and hexarotor.

Specifically, the folding propeller, a power component and an unmanned aerial vehicle provided by the embodiments of the present application will be described in detail below in conjunction with the drawings of the specification.

Figure 1:
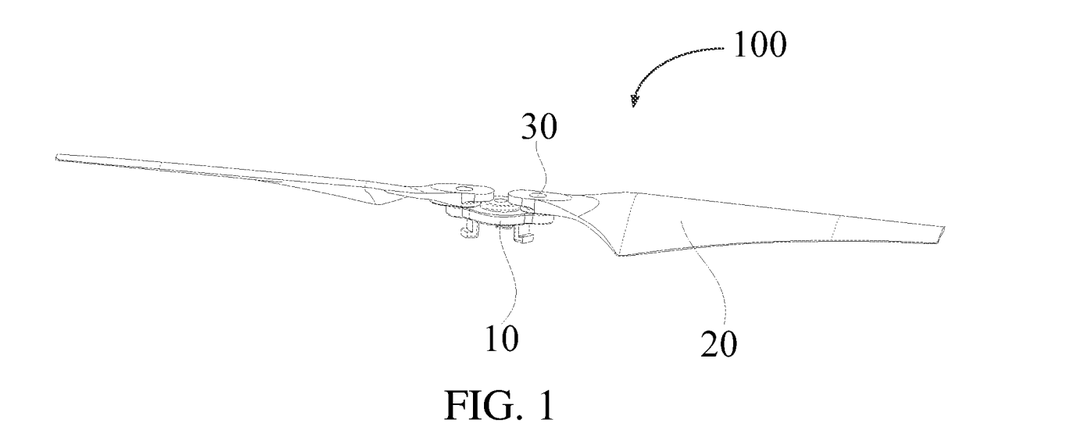
FIG. 1 is a schematic three-dimensional structural view of a folding propeller provided by one of the embodiments of the present application.
Figure 2:
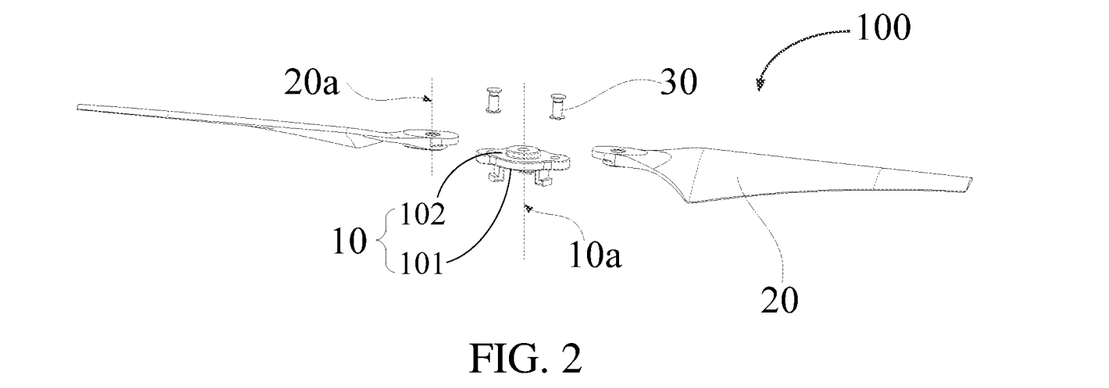
FIG. 2 is a three-dimensional structural exploded view of the folding propeller shown in FIG. 1.

FIG. 1 is a schematic three-dimensional structural view of a folding propeller provided by one of the embodiments of the present application, and FIG. 2 is a three-dimensional exploded view of the folding propeller shown in FIG. 1. Referring to FIG. 1 and FIG. 2, the folding propeller 100 includes a hub 10, two blades 20 and two connecting pieces 30. The hub 10 is configured to mount the folding propeller 100 to a driving device. The hub 10 includes a first surface 101 and a second surface 102 disposed oppositely, the first surface 101 facing the driving device, and the second surface 102 facing away from the driving device. Each of the blades 20 is mounted on the second surface 102 by the corresponding connecting piece 30, and each of the blades 20 is capable of rotating relative to the hub 10. A rotation axis 20a of each of the blades 20 is parallel to an axial center line 10a of the hub 10 (or a center line of a rotating shaft of the driving device). The rotation axis 20a may be an axial center line of the connecting piece 30. Thereby, in the embodiment of the present application, each of the blades 20 can be folded leftward or rightward relative to the hub 10.

It should be understood that in the embodiment of the present application, the damping between the blade 20 and the hub 10 needs to be controlled within a certain range to ensure that the blades 20 can be normally opened during rotation, and the damping of each blade 20 and the hub 10 cannot differ greatly to ensure that the dynamic balance of the folding propeller 100 meets flight requirements.

The hub 10 is configured to mount the blades 20, and the folding propeller 100 is mounted on the driving device and fixedly connected to the rotating shaft of the driving device. When the hub 10 is driven to rotate at the high speed by the rotating shaft of the driving device, the two blades 20 expand under the action of centrifugal force. When the two blades 20 expand, there exists the same rotary damping between the two blades 20 and the hub 10. When the folding propeller 100 is stored, one of the blades 20 can be rotated leftward relative to hub 10 around the corresponding connecting piece 30, and at the same time, the other blade 20 can be rotated rightward relative to the hub 10 around the corresponding connecting piece 30, thereby realizing folding of the blades, saving the space and making the folding propeller portable.

It should be understood that although only two blades 20 and two connecting pieces 30 are taken as an example in the present embodiment, in other embodiments, larger numbers of blades 20 and connecting pieces 30 may be included, and each of the blades 20 may also be mounted on the second surface 102 of the hub 10 by a larger number of connecting pieces 30.

Figure 3:
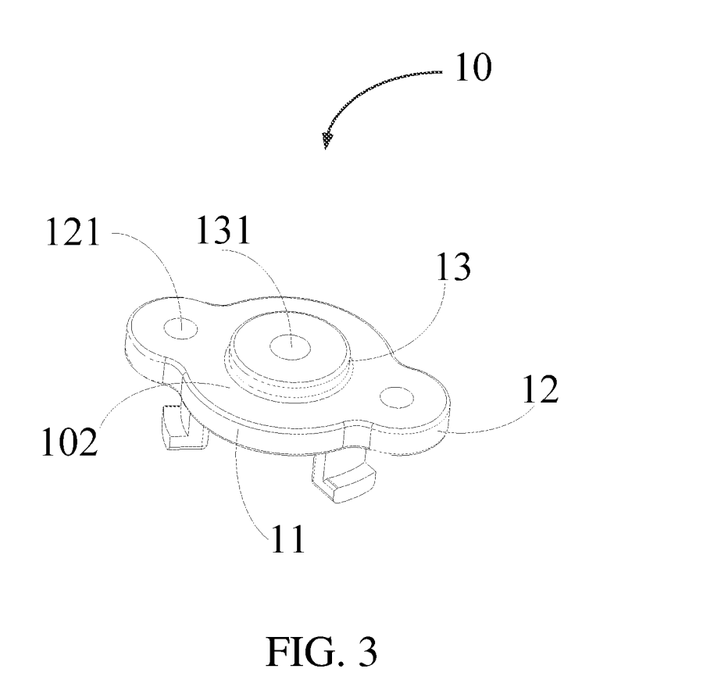
FIG. 3 is a schematic three-dimensional structural view of a hub in the folding propeller shown in FIG. 2.
Figure 4:
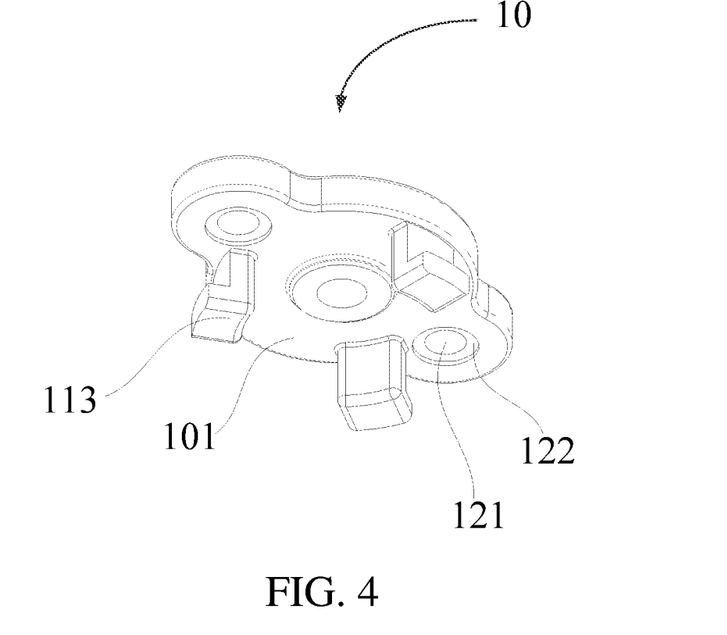
FIG. 4 is a schematic three-dimensional structural view of the hub shown in FIG. 3 from another viewing angle.

Specifically, referring to FIG. 3 and FIG. 4, the hub 10 includes a main body portion 11, two overlapping portions 12 connected to the main body portion 11 and a boss 13 extending from the main body portion 11. The main body portion 11 and the overlapping portion 12 respectively include two surfaces disposed oppositely, one surface of the main body portion 11 being connected to one surface of the overlapping portion 12 to form the first surface 101, and the other surface of the main body portion 11 being connected to the other surface of the overlapping portion 12 to form the second surface 102. The boss 13 is disposed on the second surface 102 of the main body portion 11.

In the present embodiment, as shown in FIG. 4, a fastener 113 configured to quickly assemble or disassemble the folding propeller 100 to or from the corresponding driving device extends from the first surface 101 of the main body portion 11. The number of the fasteners 113 may be, but is not limited to, 1, 2, 3, 5 or the like. When the number of the fasteners 113 is N, the fasteners may be uniformly distributed on the first surface 101 of the main body portion 11 according to an angle of 360°/N. In the present embodiment, three fasteners 113 are adopted, and the three fasteners 113 are uniformly distributed on the first surface 101 of the main body portion 11 according to an angle of 120°. Each of the fasteners 113 is T-shaped, and includes a connecting portion extending from a bottom of the main body portion 11 and a fastening portion formed at a tail end of the connecting portion. Particularly, in order to improve the firmness of mounting the folding propeller 100 to the corresponding driving device, a thickness or average thickness of the fastening portion of the fastener 113 is at least 1.2 millimeters, and a height or average height of the fastener 113 is at least 3.0 millimeters. In the present embodiment, by disposing the fastener 113 on the first surface 101 of the main body portion 11, the folding propeller 100 can be quickly assembled to or disassembled from the corresponding driving device. Of course, in practical application, the fastener 113 may be omitted, and the folding propeller 100 may be fixedly mounted on the corresponding driving device in other manners.

In the present embodiment, the overlapping portion 12 and the main body portion 11 may be two parts that are formed independently of each other, or may be formed integrally. A through hole 121 configured to mount the blade 20 is formed in each of the overlapping portions 12 respectively. As shown in FIG. 4, a first groove 122 is formed in each of the overlapping portions 12 on the first surface 101. A center line of the first groove 122 coincides with a center axis of the through hole 121 to accommodate the corresponding connecting piece 30, thereby improving the compactness of the folding propeller 100. Of course, it can be understood that in some embodiments, the first groove 122 may also be omitted. In addition, it can further be understood that in the present embodiment, the overlapping portion 12 is in one-to-one correspondence with the blade 20 and the connecting piece 30, the overlapping portion 12 being pivoted to the blade 20 by the connecting piece 30. Therefore, in practical application, the number of the overlapping portions 12 is also not limited to two.

In the present embodiment, the boss 13 is disposed on the second surface 102 of the main body portion 11 to distribute the pulling force borne by the blade 20 to the hub 10 when the folding propeller 100 rotates at the high speed, thereby reducing the bending moment borne by the end of the blade 20 connected to the hub 10, preventing a joint between the blade 20 and the hub 10 from deformation due to excessive force, and ensuring the service life of the end of the blade 20 connected to the hub 10 and the reliability of the folding propeller 100 during operation. Particularly, in the present embodiment, the boss 13 has an annular cross section, and is disposed coaxially with the rotating shaft of the corresponding driving device. A center hole 131 configured to assemble the rotating shaft of the corresponding driving device is formed in the center of the boss.

It can be understood that in the present embodiment, a center line of the boss 13 coincides with a center line of the rotating shaft of the driving device, so that all the blades 20 can distribute the borne force to the hub 10 by the boss 13, thereby reducing the number of the bosses 13, facilitating mold establishment and reducing the production cost. In some other embodiments, the boss 13 may also be disposed at other positions, and the number may not be limited to 1. For example, in a hub 10' shown in FIG. 5 (or a hub 10" shown in FIG. 6), the number of bosses 13' (or bosses 13") may also be two. The two bosses 13' (or bosses 13") may be disposed respectively corresponding to the blades 20, that is, one blade 20 corresponds to one boss 13' (or boss 13").

Figure 5:
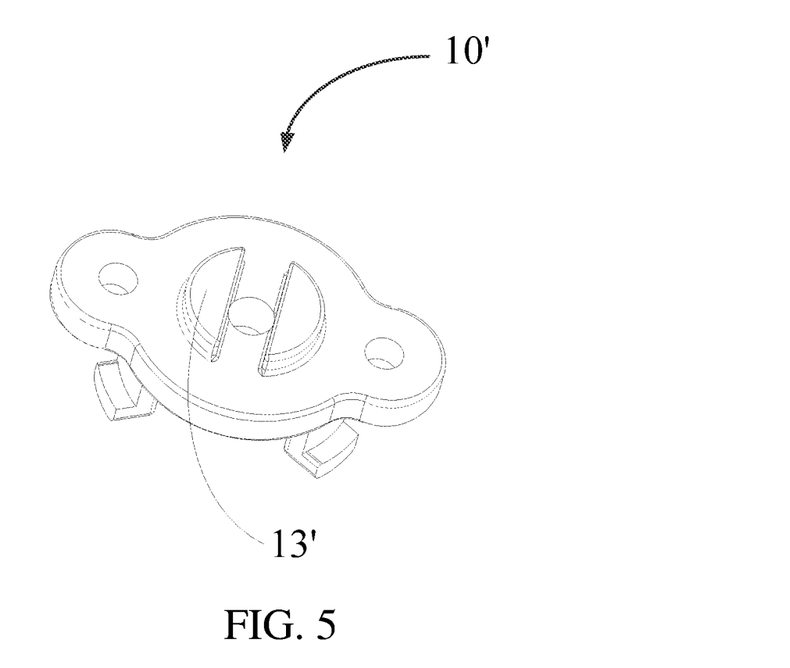
FIG. 5 is a schematic three-dimensional structural view of another hub provided by the embodiment of the present application.
Figure 6:
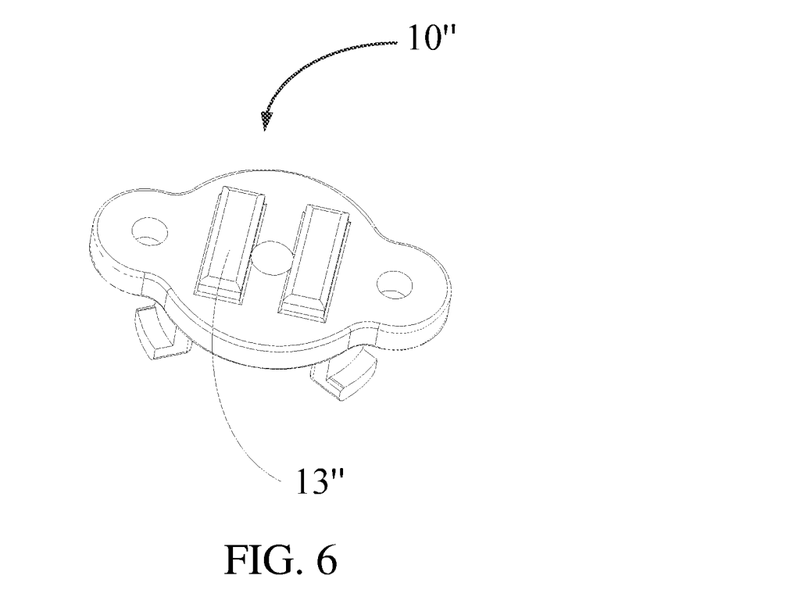
FIG. 6 is a schematic three-dimensional structural view of still another hub provided by the embodiment of the present application.

In addition, it can also be understood that in the present embodiment, the boss 13 has the annular cross section, on the one hand, to facilitate the rotation of the blade 20 relative to the hub 10, and on the other hand, to increase the contact area between the boss 13 and the blade 10 when the blade 20 abuts against the boss 13 and to enhance the force distribution effect, thereby further improving the stability of the folding propeller 100 when rotating at the high speed. In some other embodiments, the boss 13 may also have a cross section in other shapes, for example, as shown in FIG. 5, the boss 13' of the hub 10' has a semicircular cross section, or as shown in FIG. 6, the boss 13" of the hub 10" has a rectangular cross section.

Furthermore, it can further be understood that in the present embodiment, the reliability of the folding propeller 100 during operation is improved by disposing the boss 13. In some other embodiments, if the torque borne by the end of the blade 20 connected to the hub 10 is small when the propeller is in operation, the boss 13 may also be omitted.

Figure 7:
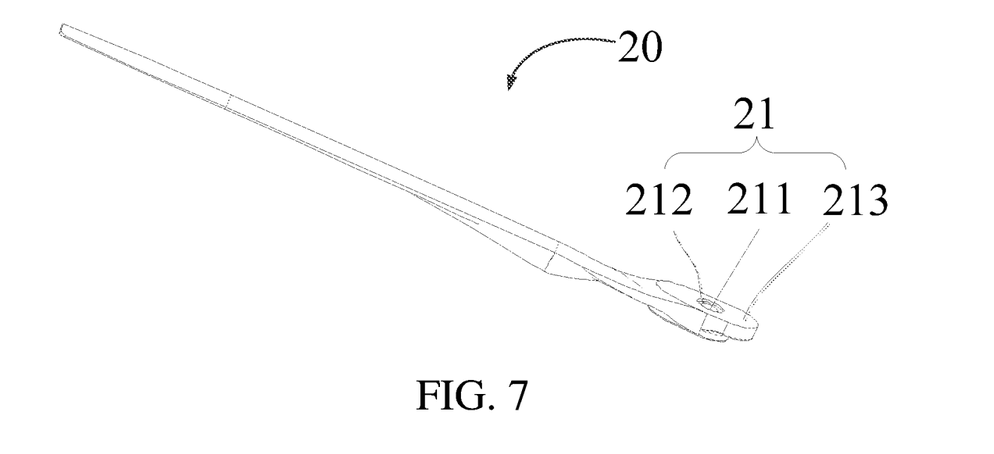
FIG. 7 is a schematic three-dimensional structural view of a blade in the folding propeller shown in FIG. 2.

Referring to FIG. 7, each of the blades 20 includes a pivoting portion 21 to be connected to the hub 10, and each of the pivoting portions 21 is overlapped on the corresponding overlapping portion 12 and pivoted to the overlapping portion 12 by the connecting piece 30. A lower surface of the pivoting portion 21 is in contact with the second surface 102 of the overlapping portion 12. A mounting hole 211 is formed in the pivoting portion 21 corresponding to the through hole 121 of the overlapping portion 12. The corresponding connecting piece 30 passes through the mounting hole 211 and the through hole 121 to mount the blade 20 to an upper side (that is, the second surface 102) of the overlapping portion 12. Particularly, in the present embodiment, the blade 20 and the overlapping portion 12 may be connected together by injection molding. Further, in order to improve the compactness of the folding propeller 100, a second groove 212 is formed in one side of the pivoting portion 21 away from the overlapping portion 12, and the second groove 212 is disposed coaxially with the mounting hole 211 to accommodate the corresponding connecting piece 30. Similarly, it can be understood that in some other embodiments, the second groove 212 may also be omitted.

Specifically, referring to FIG. 1 and FIG. 7, a protruding edge 213 extends from the pivoting portion 21, the protruding edge 213 being overlapped on the boss 13, and a lower surface of the protruding edge 213 being in contact with an upper surface of the boss 13. Thus, when the folding propeller 100 rotates at the high speed, the force borne by the pivot portion 21 can be transmitted to the boss 13 through the protruding edge 213 and finally distributed to the main body portion 11. Specifically, when the pulling force generated by the high speed rotation of the blade 20 enables a tip of the blade 20 (that is, the end of the blade 20 away from the hub 10) to generate an upward deformation displacement, under the lever action (its lever center point is the pivotal joint between the pivoting portion 21 and the overlapping portion 12), the protruding edge 213 will generate a downward deformation displacement. Since the protruding edge 213 is overlapped with the boss 13, the boss 13 will generate an upward reaction force to the protruding edge 213 to balance the torque generated by the pivoting portion 21 of the blade 20 under the action of the pulling force, so that the bending moment borne by the pivoting portion 21 is reduced, thereby preventing the mounting hole 211 in the pivoting portion 21 from deformation due to excessive force, and ensuring the service life of the pivoting portion 21 and the reliability of the folding propeller 100 during operation.

In some other embodiments, in the natural state where the folding propeller 100 is stationary, the lower surface of the protruding edge 213 and the upper surface of the boss 13 may not be in contact, that is, the protruding edge 213 is suspended above the boss 13. When the folding propeller 100 is driven to rotate by the driving device, since the tip of the blade 20 is subjected to the upward pulling force, under the lever action as described above, the suspended protruding edge 213 will be in contact the upper surface of the boss 13 at this time.

Further, in the present embodiment, the protruding edge 213 is in a circular arc shape. Thus, when the protruding edge 213 generates the downward deformation displacement under the lever action, on the one hand, the contact area of the protruding edge 213 and the boss 13 can be increased, thereby increasing the stress surface of the protruding edge 213, and better balancing the torque borne by the pivoting portion 21, and on the other hand, stress inside the protruding edge 213 can be distributed, thereby preventing the protruding edge 213 from breaking due to excessive concentration of internal stress.

It can be understood that in the present embodiment, setting the protruding edge 213 in the circular arc shape is only one of the preferred implementations. In some other embodiments, comprehensively considering the technical conditions, the specific force condition of the pivoting portion 21 and other factors, the protruding edge 213 may also be set in other suitable shapes.

Figure 8:
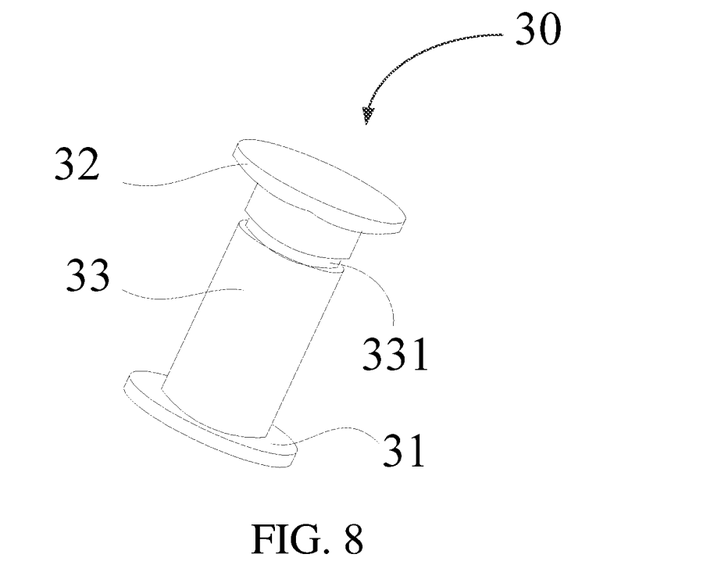
FIG. 8 is a schematic three-dimensional structural view of a connecting piece in the folding propeller shown in FIG. 2.

Specifically, referring to FIG. 8, the connecting piece 30 is in an "I" shape, and includes a first abutting portion 31 and a second abutting portion 32 disposed oppositely, and a connecting portion 33 connecting the first abutting portion 31 and the second abutting portion 32. After the hub 10, the blade 20 and the connecting piece 30 are assembled, the connecting portion 33 of the connecting piece 30 passes through the through hole 121 and the mounting hole 211, a surface of the first abutting portion 31 facing the second abutting portion 32 abuts against the first surface 101, and a surface of the second abutting portion 32 facing the first abutting portion 31 abuts against a side surface of the blade 20 facing away from the overlapping portion 12. Specifically, in the present embodiment, the first abutting portion 31 is accommodated in the first groove 122, and the second abutting portion 32 is accommodated in the second groove 212.

In the present embodiment, in order to allow the blade 20 to rotate relative to the hub 10, the blade 20 may be fixedly connected to the connecting piece by injection molding, and the hub 10 may be pivoted to the connecting piece 30. Specifically, during injection molding, the mounting hole 211 of the pivoting portion 21 is adapted to the connecting portion 33 of the connecting piece 30, and a uniform gap is left between the through hole 121 of the overlapping portion 12 and the connecting portion 33.

Figure 9:
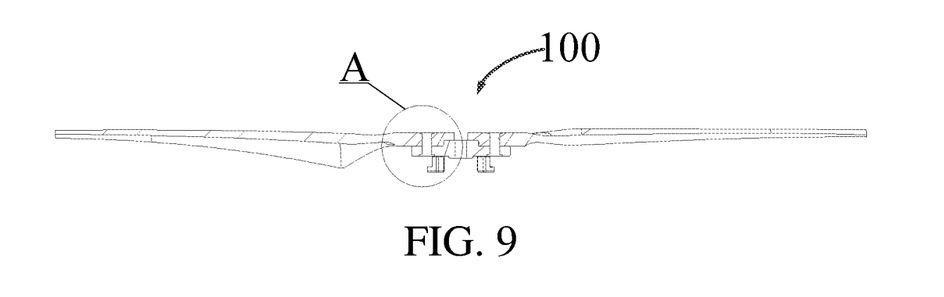
FIG. 9 is a sectional view of the folding propeller shown in FIG. 1.
Figure 10:
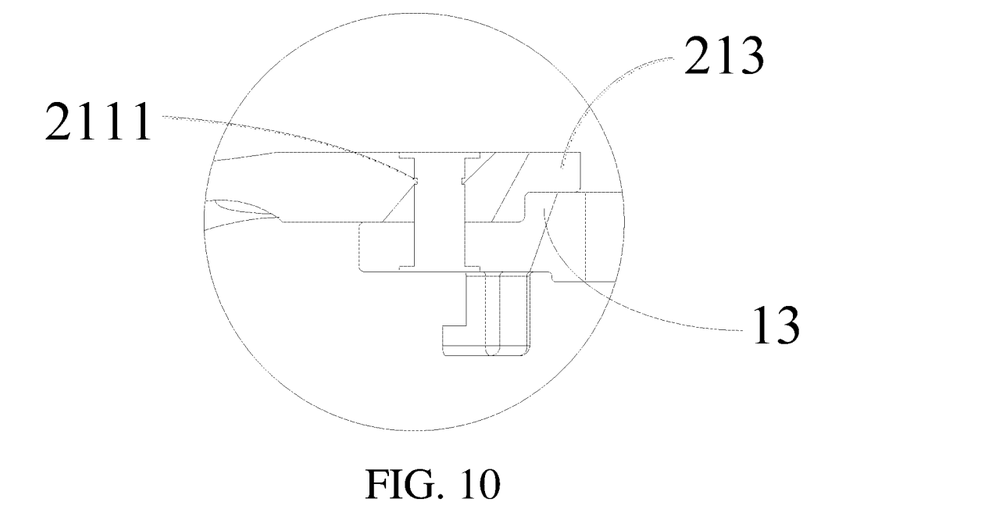
FIG. 10 is a partial enlarged view of a circle part A shown in FIG. 9.

Further, in the present embodiment, an annular groove 331 is formed in the connecting portion 33 of the connecting piece 30 corresponding to the mounting hole 211. Thus, when the blade 20 and the connecting piece 30 are connected by injection molding, an injection molding liquid of the blade 20 can flow into the annular groove 331. After the injection molding liquid is cooled and formed, as shown in FIG. 9 and FIG. 10, an annular protrusion 2111 is correspondingly disposed in the mounting hole 211 of the blade 20. The annular protrusion 2111 is locked in the annular groove 331, thereby preventing the blade 20 from sliding upward or downward relative to the connecting piece 30. Of course, in some other embodiments, the annular groove 331 may also be replaced by the annular protrusion (in this case, the annular groove is correspondingly formed in the mounting hole 211), as long as the blade 20 can be prevented from sliding upward or downward relative to the connecting piece 30. Alternatively, considering the factor of cost, the annular groove 331 may also be omitted.

Figure 11:
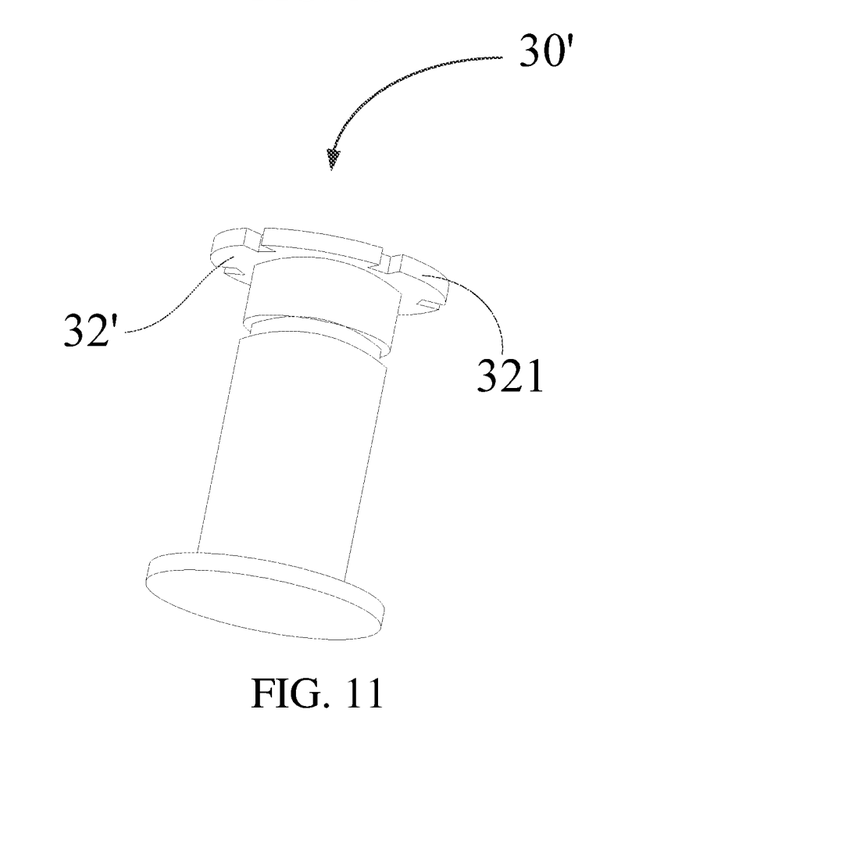
FIG. 11 is a schematic three-dimensional structural view of another connecting piece provided by the embodiment of the present application.

In addition, in some other embodiments, a second abutting portion 32' of a connecting piece 30' as shown in FIG. 11 may further include a tooth portion 321. Thus, when the blade 20 and the connecting piece 30' are connected by injection molding, an injection molding liquid can flow into a gap of the tooth portion 321. After the injection molding liquid is cooled and formed, a limit slot is formed in the blade 20 corresponding to the tooth portion 321. The tooth portion 321 is locked in the limit slot, thereby preventing the blade 20 and the connecting piece 30' from rotating relative to each other and enhancing the fastness of connection between the blade 20 and the connecting piece 30'.

In practical application, the folding propeller 100 provided by the embodiment of the present application may be formed by injection molding. For example, firstly, the connecting piece 30 may be placed in a mold corresponding to the blade 20, the blade 20 is formed by injection molding, and the blade 20 and the connecting piece 30 are fixedly connected. Then the formed blade 20 and the connecting piece 30 are placed in a mold corresponding to the hub 10 to form the hub 10, and the hub 10 is pivoted to the connecting piece 30. In the process of the injection molding, since the folding propeller 100 provided by the embodiment of the present application only has one contact surface between the blade 20 and the hub 10 when the blade 20 is opened, the friction force of only one contact surface needs to be adjusted corresponding to one blade 20 when the rotary damping between the blade 20 and the hub 10 is adjusted, which is convenient for mold adjustment, is beneficial to mass production and saves the production cost.

It can be understood that in the present embodiment, the blade 20 and the connecting piece 30 form an integral structure by injection molding, so that the hub 10 is pivoted to the connecting piece 30, and thus, the blade 20 can rotate relative to the hub 10. In some other embodiments, the connecting piece 30 and the hub 10 may be an integral structure, and the connecting piece 30 is pivoted to the blade 20. For example, during the injection molding, the through hole 121 of the overlapping portion 12 is adapted to the connecting portion 33, and a uniform gap is left between the mounting hole 211 of the blade 20 and the connecting portion 33 of the connecting piece 30. Further, in order to improve the firmness of connection between the hub 10 and the connecting piece 30, an annular groove or other structures configured to limit the hub 10 from sliding up and down relative to the connecting piece 30 may be disposed at a position of the connecting portion 33 corresponding to the through hole 121 (accordingly, an annular protrusion is formed in the through hole 121, and the annular protrusion is locked in the annular groove), and/or, a tooth portion or other structures configured to limit the hub 10 from rotating relative to the connecting piece 30 are disposed at the first abutting portion 31 (accordingly, a limit slot is formed in the hub 10 corresponding to the tooth portion, and the tooth portion is locked in the limit slot).

Figure 12:
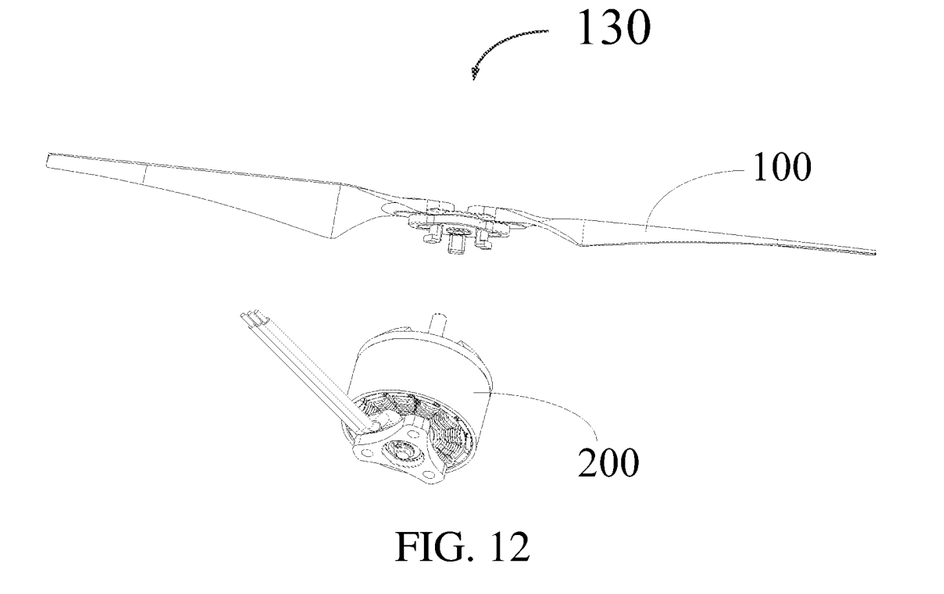
FIG. 12 is a three-dimensional structural exploded view of a power component provided by another embodiment of the present application.

FIG. 12 is a three-dimensional exploded view of a power component provided by another embodiment of the present application. The power component 130 includes a folding propeller 100 as described in the above embodiments and a driving device 200. The folding propeller 100 is mounted on the driving device 200 by the hub 10, and a rotating shaft of the driving device 200 is assembled to a center hole 131 of the hub 10. When the driving device 200 operates, its rotating shaft can drive the folding propeller 100 to rotate along a specific direction (that is, the rotating direction of the driving device 200: clockwise direction or counterclockwise direction), thereby providing movement power for a movable object using the power component 130, such as an unmanned aerial vehicle.

The driving device 200 may be any device capable of driving the folding propeller 100 to rotate, for example, it may include, but is not limited to, a brush motor, a brushless motor, a direct current motor, a stepper motor, an alternating-current induction motor or the like. The driving device 200 is fixedly provided with a mounting member configured to fix the folding propeller 100, and the fastener 113 on the folding propeller 100 is matched with the mounting member, thereby realizing quick assembly and disassembly between the folding propeller 100 and the driving device 200.

Of course, in some other embodiments, the fixing manner between the folding propeller 100 and the driving device 200 may also be other manners, which is not specifically limited in the embodiments of the present application.

Figure 13:
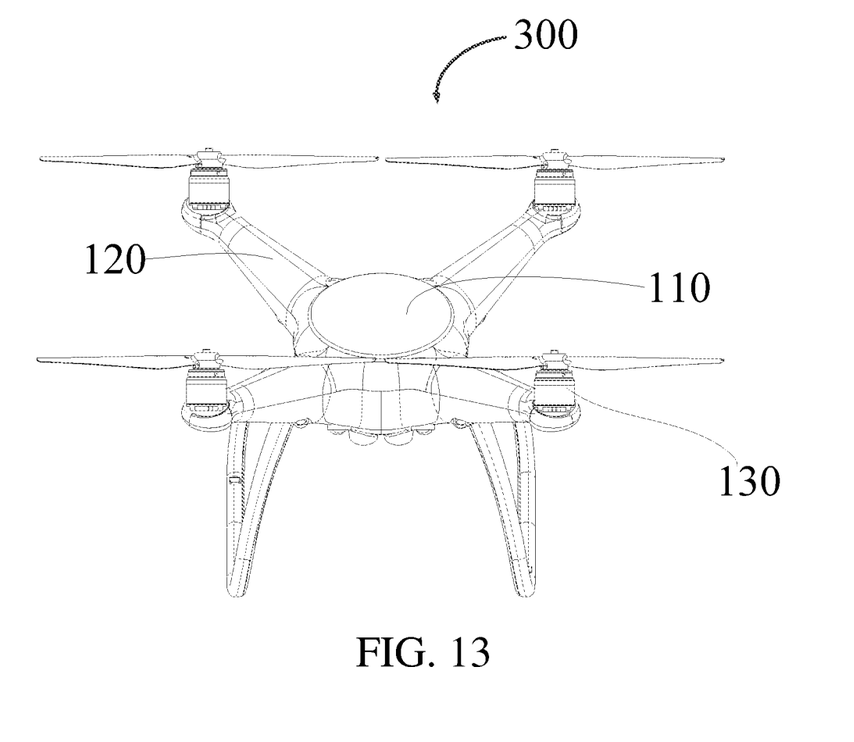
FIG. 13 is a schematic three-dimensional structural view of an unmanned aerial vehicle provided by still another embodiment of the present application.

FIG. 13 is a schematic three-dimensional structural view of an unmanned aerial vehicle provided by still another embodiment of the present application. The unmanned aerial vehicle 300 includes a body 110, arms 120 extending from the body 110 and the power components 130 as described in the above embodiment, which are respectively disposed on the arms 120.

The body 110 usually includes a control circuit component composed of an MCU and other electronic elements. The control circuit component includes a plurality of control modules, for example, a flight control module configured to control flight attitude of the unmanned aerial vehicle 300, a BeiDou module configured to navigate the unmanned aerial vehicle 300, a data processing module configured to process environmental information acquired by related airborne equipment (such as a camera device) and the like. The power component 130 is mounted on the arm 120, and configured to provide power for the unmanned aerial vehicle 300 and drive the unmanned aerial vehicle 300 to fly and adjust the flight attitude.

It can be understood that in the embodiment of the present application, a quadrotor unmanned aerial vehicle is taken as an example for description, but it is not used to limit the present application. In some other embodiments, the unmanned aerial vehicle may also be other types of multirotor unmanned aerial vehicle, for example, a single-rotor unmanned aerial vehicle, a dual-rotor unmanned aerial vehicle, and a hexarotor unmanned aerial vehicle, or the unmanned aerial vehicle may also be a tiltrotor unmanned aerial vehicle, which is not specifically limited by the embodiment of the present application.

In general, compared with the prior art, the embodiments of the present application provides the hub of the folding propeller including the first surface and the second surface disposed oppositely, the first surface faces the driving device connected to the folding propeller, the second surface faces away from the driving device, and each of the blades is mounted on the second surface by the corresponding connecting piece, so that only one contact surface is included between the blade and the hub, and during the mold adjustment in injection molding, the rotary damping between the blade and the hub can be adjusted by only adjusting the friction force of one contact surface, which is convenient for mold adjustment, is beneficial to mass production and reduces the production cost.

Further, in the embodiments of the present application, the hub of the folding propeller further includes the boss disposed on the second surface, the protruding edge extends from one end of each of the blades connected to the hub, and the protruding edge is overlapped on the boss. Thus, when the folding propeller rotates at a high speed, the force borne by the end of the blade connected to the hub can be distributed to the hub through the protruding edge and the boss, so that the reliability of the folding propeller during operation can be ensured without disposing a clamping structure in the hub.

It should be noted that, the specification of this application and the accompanying drawings thereof illustrate preferred embodiments of this application. However, this application can be implemented in various different forms, and is not limited to the embodiments described in this specification. These embodiments are not intended to be an additional limitation on the content of this application, and are described for the purpose of providing a more thorough and comprehensive understanding of the content disclosed in this application. Moreover, the above technical features can further be combined to form various embodiments not listed above, and all such embodiments shall be construed as falling within the scope of this application. Further, persons of ordinary skill in the art may make improvements and variations according to the above descriptions, and such improvements and variations shall all fall within the protection scope of the appended claims of this application.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A folding propeller, comprising a hub, at least two blades and at least two connecting pieces, the hub being configured to mount the folding propeller to a driving device;

wherein the hub comprises a first surface and a second surface disposed oppositely, the first surface facing the driving device, and the second surface facing away from the driving device;

each of the at least two connecting pieces comprises a first abutting portion, a second abutting portion and a connecting portion connecting the first abutting portion and the second abutting portion; each of the at least two blades is mounted on the second surface by a respective one of the at least two connecting pieces, and each of the at least two blades is capable of rotating relative to the hub;

each of the at least two blades is fixedly connected to the respective one of the at least two connecting pieces by injection molding, and the hub is pivoted to the at least two connecting pieces, allowing the at least two blades to rotate relative to the hub; or the hub is fixedly connected to the at least two connecting pieces by injection molding, and each of the at least two blades is pivoted to the respective one of the at least two connecting pieces, allowing the at least two blades to rotate relative to the hub;

the hub comprises a main body portion and at least two overlapping portions connected to the main body portion, and the main body portion and the at least two overlapping portions each comprise two surfaces disposed oppositely. one surfa e of the main body portion being connected to one surface of each of the at least two overlapping portions to form the first surface, and the other surface of the main body portion being connected to the other surface of each of the at least two overlapping portions to form the second surface;

each of the at least two overlapping portions is pivoted to a respective one of the at least two blades by the respective one of the at least two connecting pieces;

each of the at least two blades comprises a pivoting portion, and each pivoting portion is overlapped on a respective one of the at least two overlapping portions and pivoted to the pect one f the at least two overlapping portions by the respective one of the wo connecting pieces;

a through hole is formed in each of the at least two overlapping portions;

a mounting hole is formed in each of the at least two pivoting portions;

each connecting piece passes through a corresponding one mounting hole and a corresponding one through hole to mount each of the at least two blades to the respective one of the at least two overlapping portions;

a surface of the first abutting portion facing the second abutting portion abuts against the first surface;

a surface of the second abutting portion facing the first abutting portion abuts against a side surface of tl respective one of the at least two blades facing away from the at least two overlapping portions; and the connecting portion passes through the corresponding one mounting hole and the corresponding one through hole.

2. The folding propeller according to claim 1, wherein a lower surface of each pivoting portion is in contact with the second surface.

3. The folding propeller according to claim 1, wherein the hub further comprises a boss disposed on the second surface a protruding edge extends from each pivoting portion and is overlapped on the boss.

4. The folding propeller according to claim 3, wherein a lower surface of each protruding edge is in contact with an upper surface of the boss.

5. The folding propeller according to claim 3, wherein the boss has an annular cross section.

6. The folding propeller according to claim 3, wherein a center line of the boss coincides with a center line of a rotating shaft of the driving device.

7. The folding propeller according to claim 3, wherein the hub comprises two bosses.

8. The folding propeller according to claim 7, wherein the two units of bosses each has a semicircular or rectangular cross section.

9. The folding propeller according to claim 3, wherein each protruding edge is in a circular arc shape.

10. The folding propeller according to claim 1, wherein the hub further comprises a boss disposed on the second surface; and
a protruding edge extends from each pivoting portion and is located above the boss, wherein when the folding propeller is driven to rotate by the driving device, each protruding edge is in contact with an upper surface of the boss.

11. The folding propeller according to claim 1, wherein when each of the at least two blades is fixedly connected to the respective one of the at least two connecting pieces by injection molding, and the hub is pivoted to the at least two connecting pieces, allowing the at least two blades to rotate relative to the hub, an annular groove is formed in each of the at least two connecting portions, an annular protrusion is disposed in each mounting hole, and each annular protrusion is locked in a corresponding annular groove.

12. The folding propeller according to claim 1, wherein when each of the at least two blades is fixedly connected to the respective one of the at least two connecting pieces by injection molding, and the hub is pivoted to the at least two connecting pieces, allowing the at least two blades to rotate relative to the hub, each second abutting portion comprises a tooth portion, a limit slot is formed in each blade, and each tooth portion is locked in a corresponding limit slot.

13. The folding propeller according to claim 1, wherein when the hub is fixedly connected to the at least two connecting pieces by injection molding, and each of the at least two blades is pivoted to the respective one of the at least two connecting pieces, allowing the at least two blades to rotate relative to the hub, an annular protrusion is disposed in each through hole, and each annular protrusion is locked in a corresponding annular groove.

14. The folding propeller according to claim 1, wherein when the hub is fixedly connected to the at least two connecting pieces by injection molding, and each of the at least two blades is pivoted to the respective one of the at least two connecting pieces, allowing the at least two blades to rotate relative to the hub, each first abutting portion comprises a tooth portion, a limit slot is formed in the hub, and each tooth portion is locked in the limit slot.

* * * * *